(12) United States Patent
Niikura et al.

(10) Patent No.: US 10,104,244 B2
(45) Date of Patent: Oct. 16, 2018

(54) IMAGE PROCESSING SYSTEM INCLUDING IMAGE PROCESSING DEVICE AND INFORMATION PROCESSING DEVICE WHICH COMMUNICATE WITH EACH OTHER

(71) Applicant: CANON KABUSHIKI KAISHA, Tokyo (JP)

(72) Inventors: Yasuhito Niikura, Matsudo (JP); Fumio Shoji, Komae (JP); Takao Ikuno, Yokohama (JP); Masahiro Odaira, Kawasaki (JP); Yoshiaki Katahira, Yokohama (JP); Toru Fujino, Kawaguchi (JP); Kenji Kasuya, Yokohama (JP); Noritsugu Okayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 14/617,002

(22) Filed: Feb. 9, 2015

(65) Prior Publication Data

US 2015/0156344 A1 Jun. 4, 2015

Related U.S. Application Data

(63) Continuation of application No. 11/571,928, filed as application No. PCT/JP2005/012725 on Jul. 5, 2005, now Pat. No. 8,982,381.

(30) Foreign Application Priority Data

Jul. 12, 2004 (JP) ................................. 2004-205063

(51) Int. Cl.
H04N 1/00 (2006.01)
H04N 1/32 (2006.01)

(52) U.S. Cl.
CPC ....... H04N 1/00209 (2013.01); H04N 1/0048 (2013.01); H04N 1/32117 (2013.01);
(Continued)

(58) Field of Classification Search
None
See application file for complete search history.

(56) References Cited

U.S. PATENT DOCUMENTS 5,428,673 A 6/1995 Nakagawa et al. ........... 379/100
5,684,604 A 11/1997 Nakajima et al. ............ 358/434
(Continued)

FOREIGN PATENT DOCUMENTS

JP 2000-315182 11/2000
JP 2001-028655 1/2001
(Continued)

Primary Examiner — John R Wallace
(74) Attorney, Agent, or Firm — Fitzpatrick, Cella, Harper & Scinto (57) ABSTRACT

Provided is an image processing system which reduces the load of destination registration on the user. To accomplish this, in an image processing system including a PC (102) and device (101) connected to a network, the PC (102) has a transfer unit (120) which transfers identification data of the PC (102) to the device (101), and the device (101) has a scanner unit (130) which scans an image and outputs the image data, a memory (140) which stores a destination of the output image data from the scanner unit (130), a transfer unit (150) which transfers the image data to the destination stored in the memory (140), and a registration unit (170) which receives the identification data transferred by the transfer unit (120), and registers the received identification data as a destination of image data in the memory (140).

18 Claims, 7 Drawing Sheets

(52) U.S. Cl.
CPC . *H04N 1/32539* (2013.01); *H04N 2201/3205* (2013.01); *H04N 2201/3226* (2013.01); *H04N 2201/3276* (2013.01); *H04N 2201/3278* (2013.01)

(56) References Cited

U.S. PATENT DOCUMENTS

| | | | |
|---|---|---|---|
| 6,088,131 A | 7/2000 | Imai et al. | 358/450 |
| 6,292,509 B1 | 9/2001 | Fujino | 375/222 |
| 6,301,016 B1 | 10/2001 | Matsueda et al. | 358/407 |
| 6,301,018 B1 | 10/2001 | Maeda et al. | 358/449 |
| 6,417,935 B1 | 7/2002 | Saito et al. | 358/450 |
| 6,442,252 B1 | 8/2002 | Fujise et al. | 379/100.01 |
| 6,476,935 B1 | 11/2002 | Fujino | 358/400 |
| 6,563,607 B1 | 5/2003 | Nakamura et al. | 358/450 |
| 7,298,508 B2 * | 11/2007 | Furukawa | G06F 3/121 358/1.14 |
| 8,982,381 B2 * | 3/2015 | Niikura | H04N 1/00209 358/1.15 |
| 2001/0052995 A1 | 12/2001 | Idehara | 358/1.15 |
| 2002/0027675 A1 | 3/2002 | Minato | 358/1.15 |
| 2002/0196463 A1 | 12/2002 | Schlonski et al. | 358/1.15 |
| 2003/0048303 A1 * | 3/2003 | Mesa | H04N 1/00204 715/771 |
| 2003/0101236 A1 * | 5/2003 | Ohara | G06F 17/30864 709/218 |
| 2003/0142334 A1 * | 7/2003 | Currans | G06F 3/1206 358/1.13 |
| 2004/0054747 A1 * | 3/2004 | Breh | H04L 69/08 709/208 |
| 2004/0196821 A1 * | 10/2004 | Haddad | H04L 29/06 370/349 |

FOREIGN PATENT DOCUMENTS

| | | |
|---|---|---|
| JP | 2002-232637 | 8/2002 |
| JP | 2003-174537 | 6/2003 |

* cited by examiner

FIG. 6

IMAGE PROCESSING SYSTEM INCLUDING IMAGE PROCESSING DEVICE AND INFORMATION PROCESSING DEVICE WHICH COMMUNICATE WITH EACH OTHER

CROSS REFERENCE TO RELATED APPLICATION

This application is a continuation of U.S. application Ser. No. 11/571,928 filed on Apr. 17, 2008, which is a National Stage of International Patent Application Ser. No. PCT/JP2005/012725, filed Jul. 5, 2005, which claims priority of Japanese Patent Application No. 2004-205063, filed Jul. 12, 2004. The entire disclosures of these prior applications are incorporated by reference herein.

TECHNICAL FIELD

The present invention relates to an image processing system including an image processing device and information processing device which communicate with each other.

BACKGROUND ART

Conventionally, an image processing device capable of transmitting image data scanned by an image scanning function to an information processing device across a network is known (Japanese Patent Laid-Open No. 2000-315182).

In the image processing device as the prior art described above, however, if an information processing device is to be registered as a destination of image data, it is necessary to directly input identification data of the information processing device by using keys of the image processing device. Accordingly, the registration of a destination is a burden on the user of this image processing device, and the image processing device does not operate properly in some cases if an incorrect address is input.

DISCLOSURE OF INVENTION

The present invention enables to provide an image processing system which reduces the load of destination registration on the user, and the peripheral techniques of the system.

According to the present invention, the image processing system includes an information processing device and image processing device connected to a network, and is characterized in that the information processing device comprises identification data transfer means for transferring identification data of the information processing device to the image processing device, and the image processing device comprises: image scanning means for scanning an image and outputting image data, storage means for storing a destination of the output image data from the image scanning means, image data transfer means for transferring the image data to the destination stored in the storage means, and registration means for receiving the identification data transferred by the identification data transfer means, and registering the received identification data as a destination of image data in the storage means.

Other features and advantages of the present invention will be apparent from the following description taken in conjunction with the accompanying drawings, in which similar reference characters designate the same or similar parts throughout the figures.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1A:
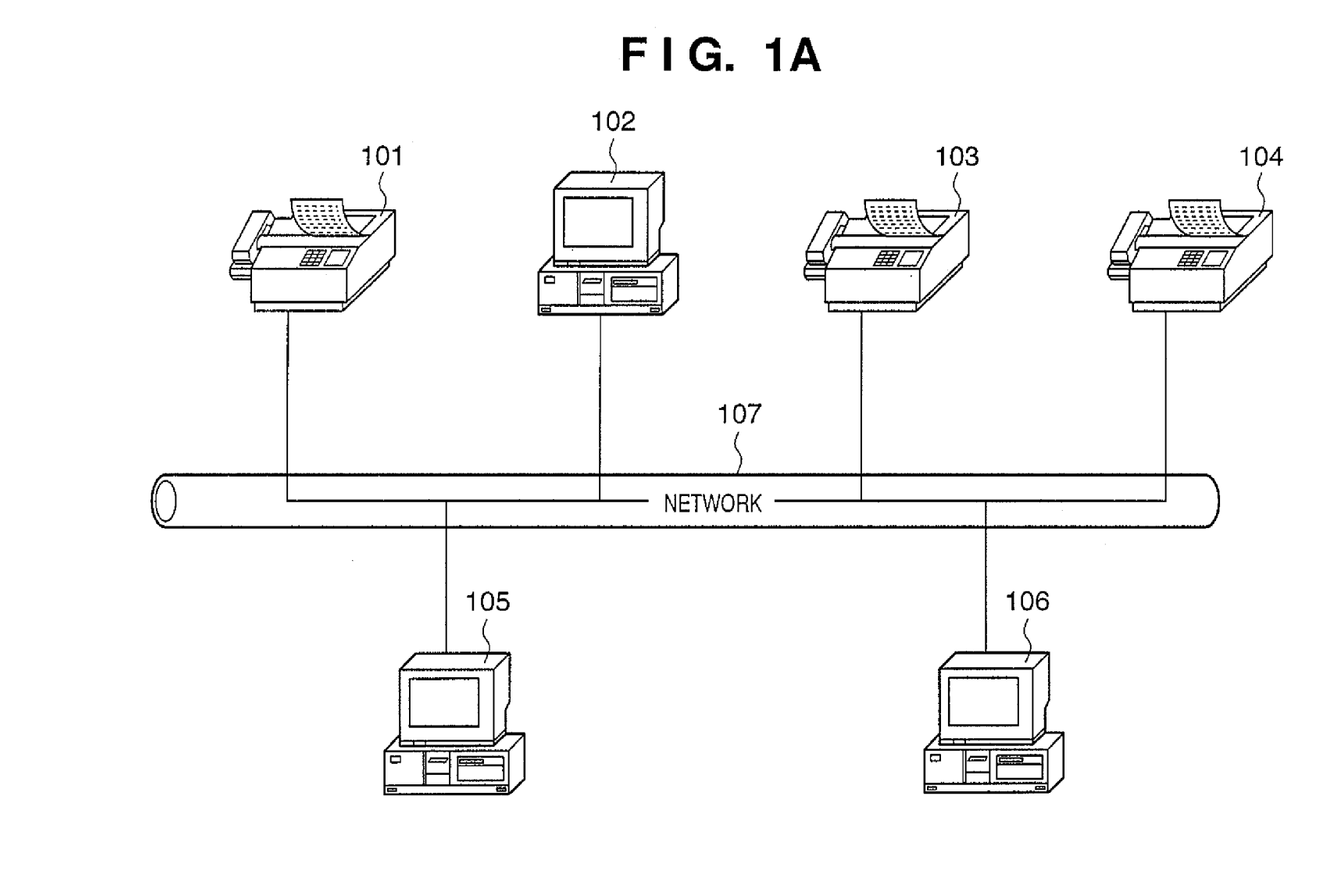
FIG. 1A is a view showing an outline of the arrangement of an image processing system as an embodiment of the present invention.

FIG. 1A is a view showing an example of an image processing system according to an embodiment of the present invention. In FIG. 1A, reference numerals 101 and 103 denote devices as image processing devices having a network interface and scanner function; and 104, a device having a network interface but no scanner function. The devices 101, 103, and 104 are connected to PCs 102, 105, and 106 having a network interface across a network 107.

Figure 1B:
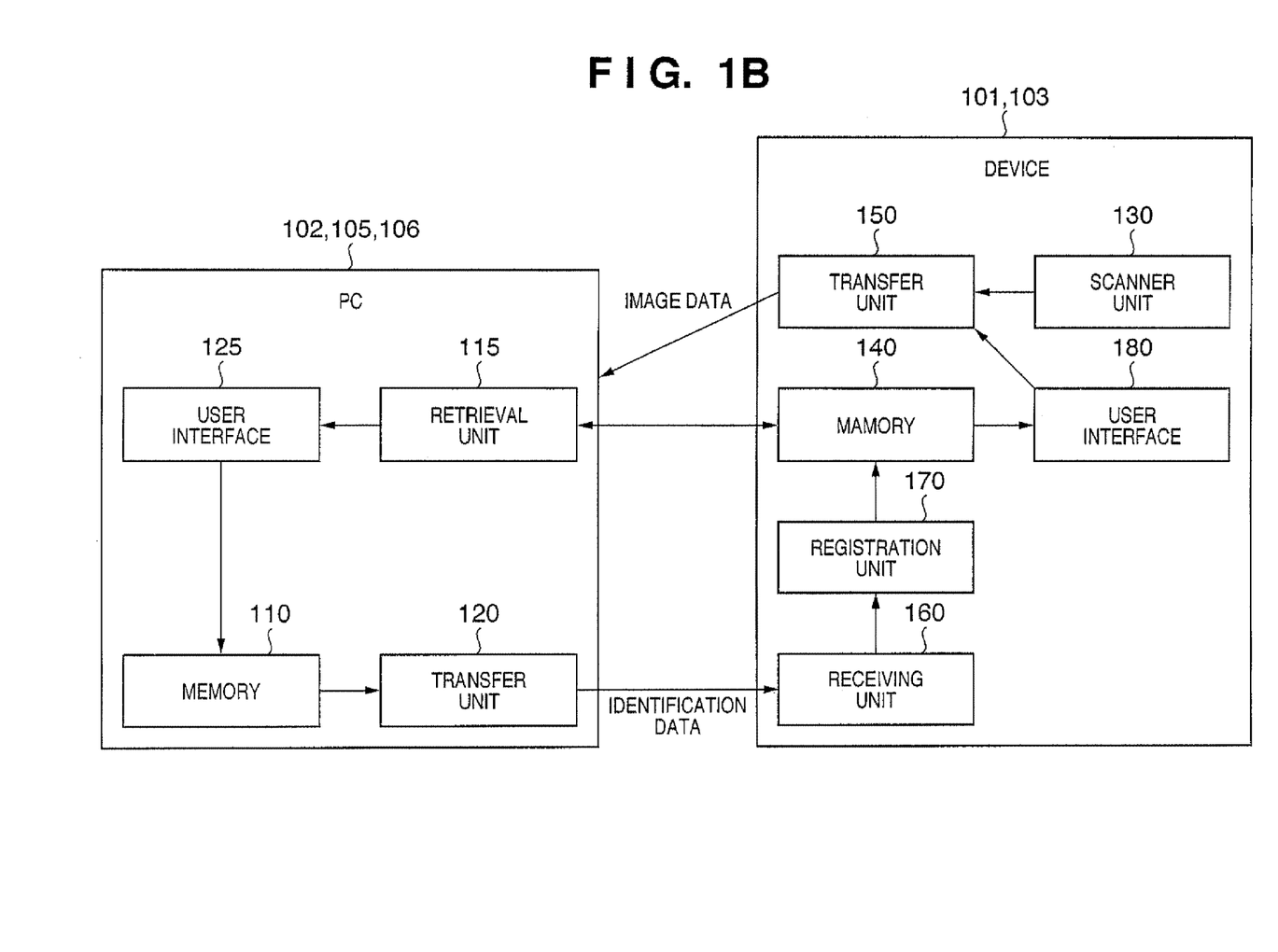
FIG. 1B is a view showing the internal arrangements of the image processing system as the embodiment of the present invention.

FIG. 1B is a view for explaining the internal arrangements of the PCs 102, 105, and 106 and devices 101 and 103 included in the image processing system.

The PC comprises a memory 110 for storing an IP address and computer name as identification data of the PC, a retrieval unit 115 as a retrieval means for retrieving a device connected to the network, a transfer unit 120 as an identification data transfer means for transferring the identification data to a device, and a user interface 125 which, if a plurality of devices are found by retrieval by the retrieval unit 115, displays a list of the devices to the user, and allows the user to select a device to which the identification data is to be transmitted.

The devices 101 and 103 comprise a scanner unit 130 as an image scanning means for scanning an image and outputting the image data, a memory 140 as a storage means for storing a destination of the image data output from the scanner unit 130, a transfer unit 150 as an image data transfer means for transferring the image data to the destination stored in the memory 140, a receiving unit 160 for receiving the identification data transferred from the transfer unit 120, a registration unit 170 as a registration means for registering the received identification data as a destination of image data in the memory 140, and a user interface 180 which allows the user to select a PC to which image data is to be transferred, from a plurality of PCs stored as destinations in the memory 140.

Figure 2:
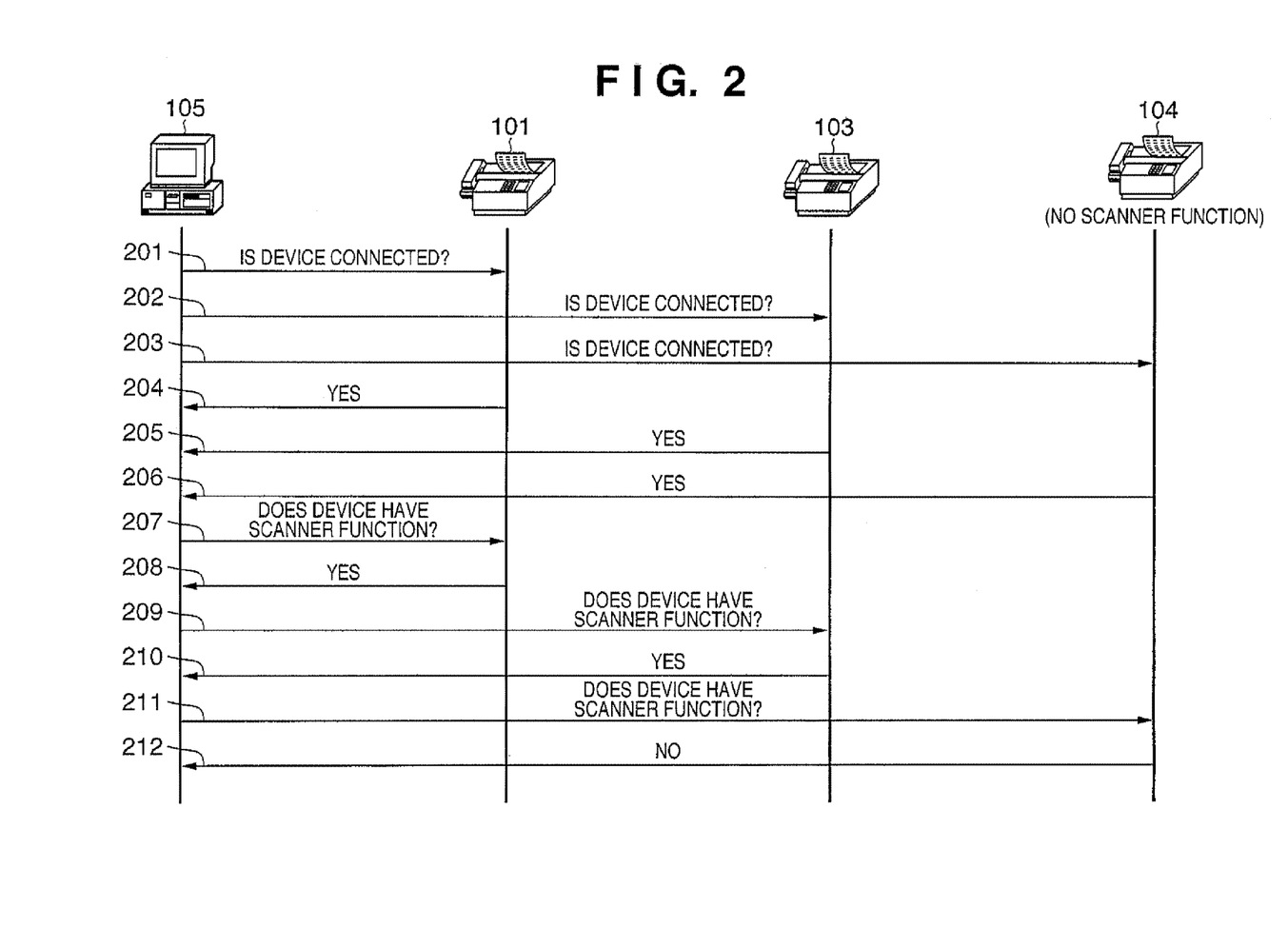
FIG. 2 is a sequence diagram for checking the presence/absence of a device and function of the image processing system as the embodiment of the present invention.

FIG. 2 is a sequence diagram showing an operation performed for the devices 101, 103, and 104 when a driver is installed in the PC 105. In FIG. 2, reference numeral 201 denotes a packet for determining whether the device 101 is connected across the network 107; 202, a packet for determining whether the device 103 is connected across the network 107; and 203, a packet for determining whether the device 104 is connected across the network 107.

Reference numeral 204 indicates a response from the device 101 to the connection confirmation request packet 201, and denotes a packet which notifies the PC 105 that the device 101 is connected to the network. Reference numeral 205 indicates a response from the device 103 to the connection confirmation request 202, and denotes a packet which notifies the PC 105 that the device is connected to the network. Reference numeral 206 indicates a response from the device 104 to the connection confirmation request packet 203, and denotes a packet which notifies the PC 105 that the device 3 is connected.

Reference numeral 207 denotes a packet for determining whether the device 101 whose connection is confirmed has a scanner function. Reference numeral 208 indicates a response from the device 101 to the scanner function confirmation request packet 207, and denotes a packet which notifies the PC 105 that the device 101 has a scanner function. Reference numeral 209 denotes a packet for determining whether the device 103 whose connection is confirmed has a scanner function. Reference numeral 210 indicates a response from the device 103 to the scanner function confirmation request 209, and denotes a packet which notifies the PC 105 that the device 103 has a scanner function. Reference numeral 211 denotes a packet for determining whether the device 104 whose connection is confirmed has a scanner function. Reference numeral 212 indicates a response from the device 104 to the scanner function confirmation request packet 211, and denotes a packet which notifies the PC 105 that the device 104 has no scanner function.

Figure 3:
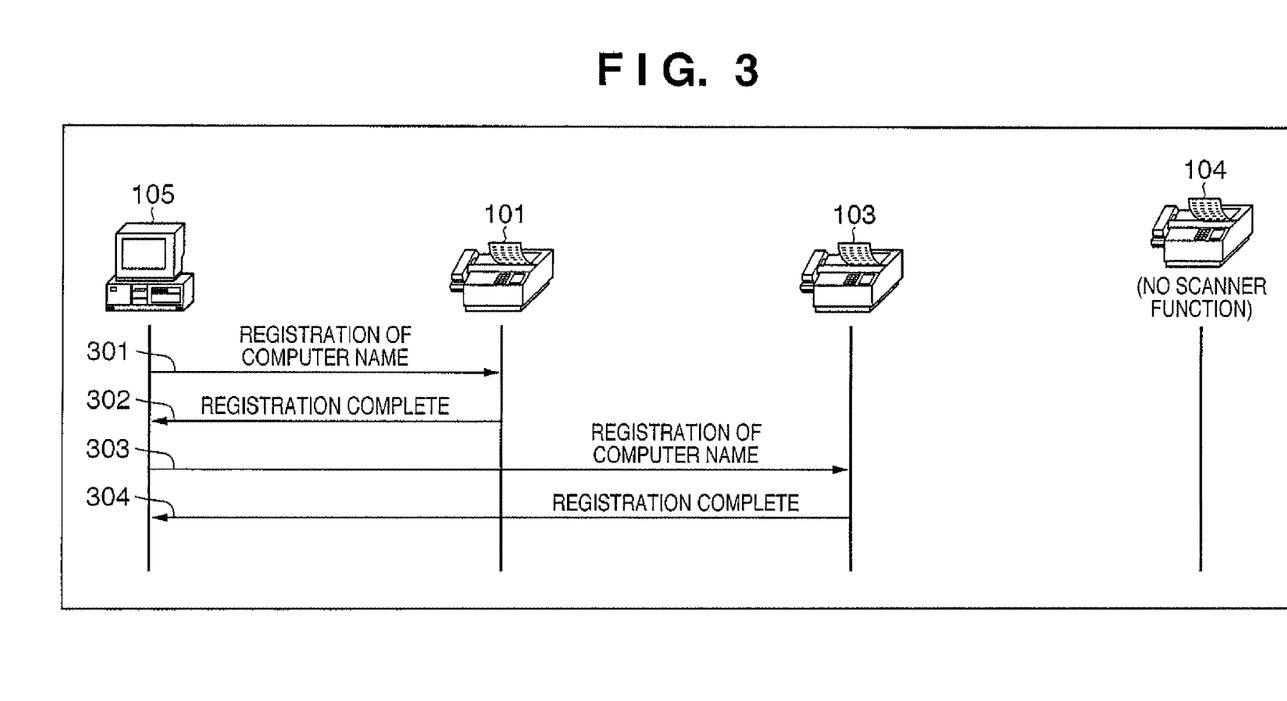
FIG. 3 is a sequence diagram for registering a computer name in the image processing system as the embodiment of the present invention.

FIG. 3 is a sequence diagram showing an operation of registering the computer name of a PC into devices having a scanner function.

In FIG. 3, reference numeral 301 denotes a packet for requesting the device 101 to register the computer name of the PC 105. Reference numeral 302 indicates a response from the device 101 to the computer name registration request 301, and denotes a packet which notifies the PC 105 that the registration is normally complete. Reference numeral 303 denotes a packet for requesting the device 103 to register the computer name of the PC 105. Reference numeral 304 indicates a response from the device 103 to the computer name registration request 303, and denotes a packet which notifies the PC 105 that the registration is normally complete. Since the device 104 has no scanner function, no computer name registration request packet is transferred from the PC 105.

Figure 4:
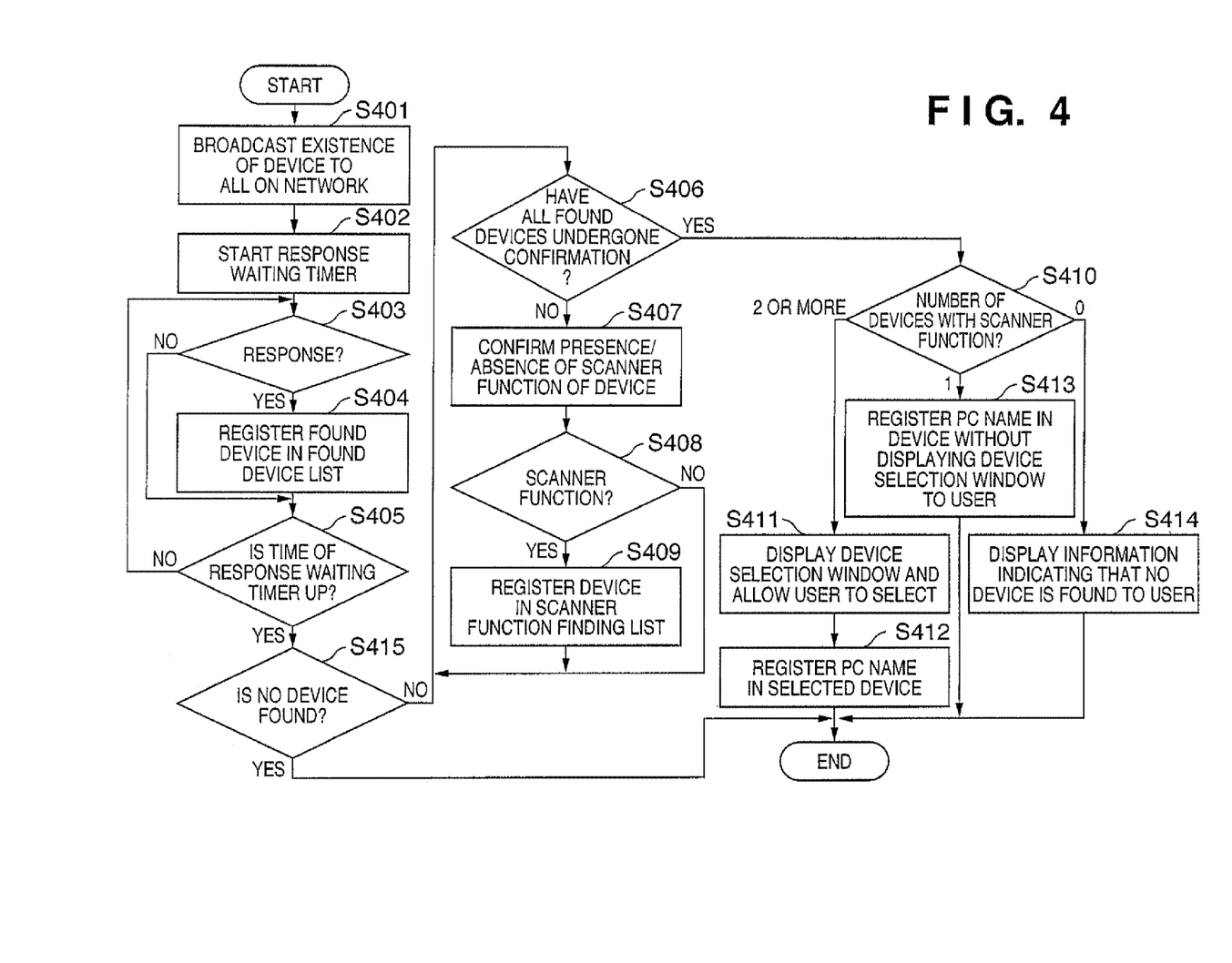
FIG. 4 is a flowchart showing processing performed by a PC of the image processing system as the embodiment of the present invention.

FIG. 4 is a flowchart when a driver is installed in the PC 105. Referring to FIG. 4, in step S401, connection confirmation request packets are confirmed by broadcast across the network 107. This step is equivalent to the operation of transferring the packets 201, 202, and 203.

Then, in step S402, a timer is set to wait for a response from a device for a period of time. In step S403, the timer waits for a response from a device on the network. If there is a response, the flow advances to step S404; if not, the flow advances to step S405. In step S404, the device having responded in step S403 is stored in a found device list. In step S405, whether the time of the timer set in step S402 has expired is determined. If the time has expired in step S405, the flow advances to step S415; if not, the flow returns to step S403.

In step S415, whether no device is found is determined. If there is no response before the time of the response waiting timer expires, it is determined that no device of interest exists on the network, and the installation is terminated. If even one device is found, the flow advances to step S406.

In step S406, whether the process of checking the presence/absence of a scanner function has been performed for all the devices found in step S404 is determined. If this confirmation has been done for all the devices, the flow advances to step S410; if not, the flow advances to step S407.

In step S407, one device which is found in step S404 and has not been confirmed whether it has a scanner function is selected, and an inquiry is made to determine if it has a scanner function. This processing is equivalent to the operation of transferring the packets 207, 209, and 211. In step S408, the timer waits for a response from the device having undergone the confirmation of the presence/absence of a scanner function in step S407. If it is confirmed by the response that the device has a scanner function, the flow advances to step S409; if not, the flow returns to step S406.

In step S409, the device found to have a scanner function in step S408 is stored. In step S410, the number of devices with a scanner function stored in step S409 is determined. If the number is two or more, the flow advances to step S411. If the number is one, the flow advances to step S413. If the number is zero, the flow advances to step S414.

If it is determined in step S410 that a plurality of devices with a scanner function are found, the flow advances to step S411 to display a window (FIG. 5) for selecting, from a plurality of devices having a scanner, a device in which the computer named of the PC is to be registered as an address, thereby prompting the user to select a device by using the user interface. It is also possible to select a plurality of devices in which the computer name of the PC is to be registered as an address.

In step S412, the computer name of the PC is registered in the device selected in step S411. This processing is equivalent to the packet transfer/receiving operation shown in FIG. 3.

Figure 5:
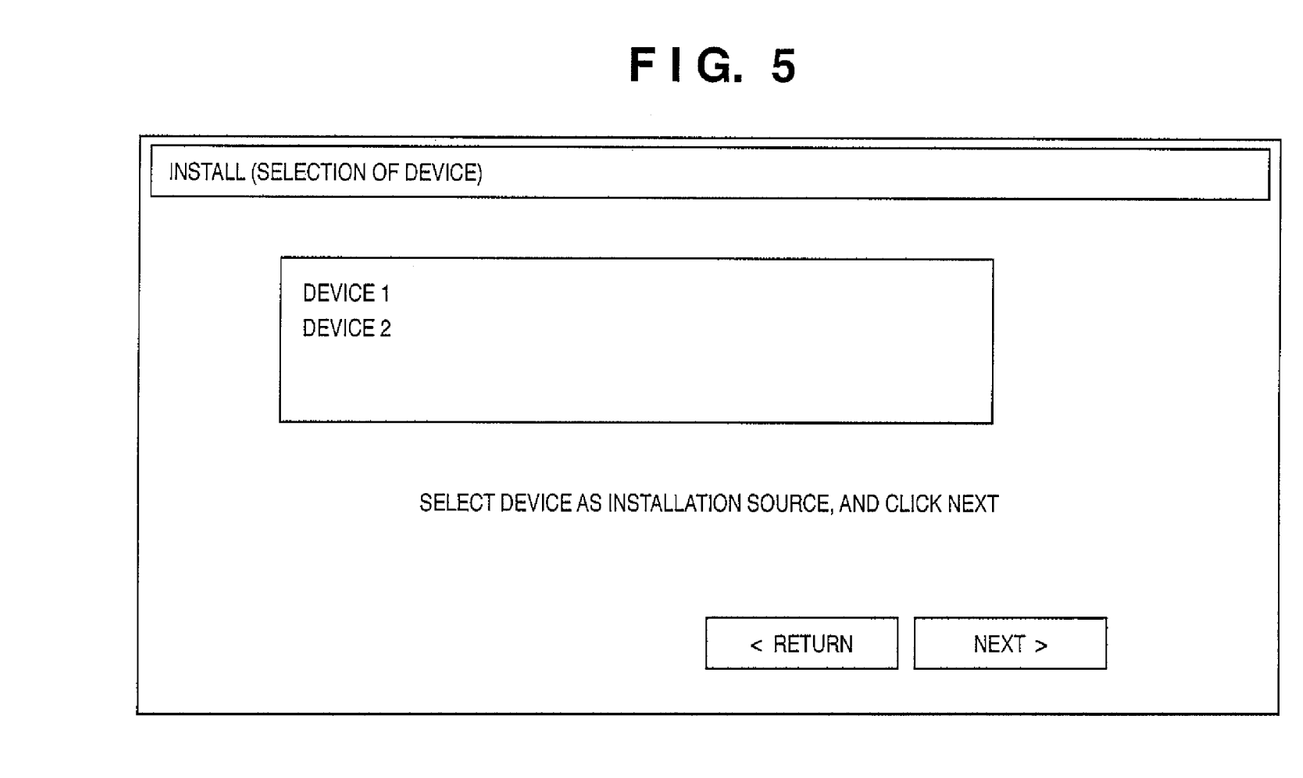
FIG. 5 is a view showing a device selection window of the image processing system as the embodiment of the present invention.

If it is determined in step S410 that there is one device having a scanner function, the flow advances to step S413 to register the computer name without displaying the device selection window shown in FIG. 5.

Figure 6:
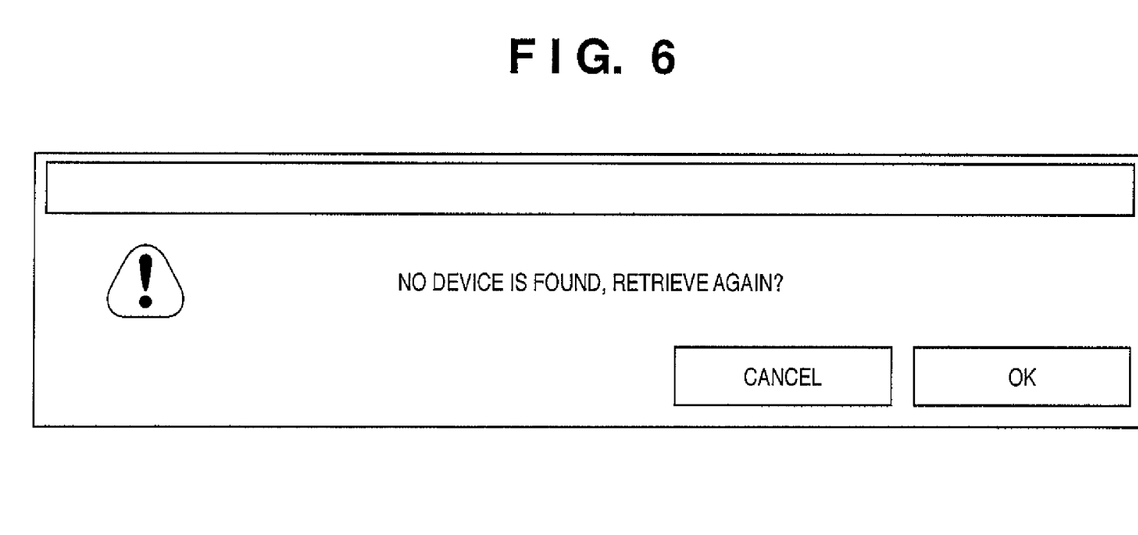
FIG. 6 is a view showing a re-retrieval window of the image processing system as the embodiment of the present invention.

If it is determined in step S410 that there is no device having a scanner function, the flow advances to step S414 to display a re-retrieval window shown in FIG. 6, thereby allowing the user to make a decision.

Note that although the device having responded in step S403 is stored in the found device list in step S404, it is also possible to always hold the found device list, and update its contents in accordance with the device having responded in step S403. In this case, in step S406, whether the process of confirming the presence/absence of a scanner function has been performed need only be determined for a new device added to the found device list. The address is registered in a new device only when a difference from the last device configuration is detected. Also, if a device which is registered in the found device list cannot be found on the network, it is possible to display this information on the user interface to allow the user to confirm the information, and prompt the user to perform re-retrieval.

Also, the polling operation is performed using the timer in steps S402 to S405 of the above embodiment, but the present invention is not limited to this, and it is also possible to re-retrieve devices a plurality of number of times at arbitrary timings.

Although the PC scans devices on the network in the above embodiment, the present invention is not limited to this, and a device may also send (broadcast), to the network, information (a packet) indicating that the device has a scanner function at each predetermined period. In this case, the PC on the network receives the packet (scanner function installed device notification) broadcast from the device, and, on the basis of the received notification, determines whether a new scanning device is added to the network. If a new scanning device is added to the network, the user of the PC is inquired of whether to register the identification data (e.g., the IP address and PC name) of the PC as an address into the added scanning device. If this registration is to be performed, the identification data of the PC and a registration request are sent to the device in the same manner as in the above embodiment.

If a device connected to the network in the past cannot be found any longer after re-retrieval, this device is stored as device disconnection, and, if a device found on the network after that is the device which is stored as device disconnection, all drivers for this device existing in other PCs are notified of the new and old pieces of device information (by broadcast or the like).

Each PC having received this notification rewrites the address of the driver to the new device information.

If an unidentified device is found, each PC on the network transfers, to drivers of other PCs, information indicating that the device address has changed, thereby rewriting the addresses of the other drivers.

Note that if a device tries to send a scanner image across the network to a PC registered as an address in the memory 140 and an error occurs because there is no such address, this error is displayed on the user interface 180, the image data is retransferred, and, if the number of successive errors has reached a predetermined value, the error address is erased from the memory 140.

Also, identification data is transferred from a PC to a device when a driver is installed in the above embodiment, but the transfer timing of this identification data is not limited to this.

In the above embodiment, an address can be automatically registered in a scanning device, so even if the number of PCs as addresses for the scanning device increases or decreases on the network, this increase or decrease can be automatically controlled. In addition, even if the address of a device or PC is changed, this change can be automatically traced.

[Other Embodiments]

Though the embodiment of the present invention has been detailed above, the invention may be applied to a system constituted by a plurality of devices, or an apparatus comprising a single device.

Further, the invention can be implemented by supplying a software program, which implements the functions of the foregoing embodiments, directly or remotely to a system or apparatus, reading the supplied program code with a computer of the system or apparatus, and then executing the program code. Accordingly, since the functions of the present invention are implemented by computer, the program code installed in the computer is also included within a technical scope of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a home page on the Internet using a browser of the client computer, and the computer program of the present invention or an automatically-installable compressed file of the program can be downloaded from the home page to a recording medium such as a hard disk. Further, the program of the present invention can be supplied by dividing the program code constituting the program into a plurality of files and downloading the files from different home pages. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a home page via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing according to the instructions of the program, so that the functions of the foregoing embodiments can be implemented by this processing.

Further, after the program read from the storage medium is written to a function expansion board inserted into the computer or to a memory provided in a function expansion unit connected to the computer, a CPU or the like mounted on the function expansion board or function expansion unit performs all or a part of the actual processing according to the instructions of the program, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-205063 filed on Jul. 12, 2004, the entire contents of which are hereby incorporated by reference herein.

The invention claimed is:
1. An image processing system comprising one or more information processing devices and one or more image processing devices connected to each other via a network, wherein each of the image processing devices includes:
a transmitter configured to transmit via the network a notification signal indicating a function of the image processing device,
wherein at least one of the information processing devices includes a processor configured to:
search for at least one image processing device having a scanning function by receiving the notification signal from an image processing device via the network;
transfer, based on the result of searching for at least one image processing device having the scanning function, identification data of the information processing device to an image processing device having the scanning function without transferring the identification data of the information processing device to another image processing device which does not have the scanning function, and
wherein at least one of the image processing devices further includes:
a scanner that scans an image and outputs image data;
a computer-readable storage medium; and
a processor configured to:
receive the identification data of an information processing device sent from the information processing device;
cause the computer-readable storage medium to store the received identification data of the information processing device;
select an information processing device whose identification data is stored in the computer-readable storage medium; and
transfer the image data outputted from the scanner to the selected information processing device.

2. The system according to claim 1, wherein the processor of each of the image processing devices is further configured to return the notification signal in response to a searching signal from an information processing device.

3. The system according to claim 1, wherein the processor of at least one of the image processing devices is further configured to transmit, in response to identification data of an information processing device received from the information processing device being successfully stored into the computer-readable storage medium, an acknowledge signal to the information processing device, the acknowledge signal indicating the success of storing the identification data.

4. The system according to claim 1, wherein the processor of an image processing device is further configured to broadcast the notification signal via the network.

5. The system according to claim 1, wherein the processor of an information processing device is further configured to broadcast a search signal for searching an image processing device having a scanning function via the network.

6. The system according to claim 1, wherein at least one of the information processing devices further includes an operation interface that is operated by a user,
wherein the processor of an information processing unit is further configured to transfer identification data of the information processing device to an image processing device having a scanning function selected by a user using the operation interface.

7. A method at an image processing system comprising one or more information processing devices and one or more image processing devices connected to each other via a network, at least one of the image processing devices including a scanner that scans an image and outputs image data and a computer-readable storage medium, the method comprising:

transmitting from each of the image processing devices via the network a notification signal indicating a function of the image processing device,
searching for at least one image processing device having a scanning function based on the notification signal received from an image processing device via the network;
transferring, based on the result of searching for at least one image processing device having the scanning function, from at least one of the information processing devices, identification data of the information processing device to an image processing device having the scanning function without transferring the identification data of the information processing device to another image processing device which does not have the scanning function;
receiving the identification data of an information processing device sent from the information processing device;
causing the computer-readable storage medium of the image processing device to store the received identification data of the information processing device;
selecting an information processing device whose identification data is stored in the computer-readable storage medium; and
transferring the image data outputted from the scanner to the selected information processing device.

8. The method according to claim 7, further comprising returning the notification signal in response to a searching signal an information processing device.

9. The method according to claim 7, further comprising transmitting, in response to identification data of an information processing device received from the information processing device being successfully stored into the computer-readable storage medium, an acknowledge signal to the information processing device, the acknowledge signal indicating the success of storing the identification data.

10. The method according to claim 7, further comprising broadcasting the notification signal via the network.

11. The method according to claim 7, further comprising broadcasting a search signal for searching an image processing device having a scanning function via the network.

12. The method according to claim 7, wherein at least one of the information processing devices further includes an operation interface that is operated by a user,
the method further comprises transferring identification data of the information processing device to an image processing device having a scanning function selected by a user using the operation interface.

13. A non-transitory computer-readable storage medium storing a program for an information processing device included in an image processing system comprising one or more information processing devices and one or more image processing devices connected to each other via a network,
wherein each of the image processing devices includes:
a transmitter configured to transmit via the network a notification signal indicating a function of the image processing device,
wherein the program, when executed by a processor of the information processing device, causes the information processing device to perform:
searching for at least one image processing device having a scanning function by receiving the notification signal from an image processing device via the network; and
transferring, based on the result of searching for at least one image processing device having the scanning function, identification data of the information processing device to an image processing device having the scanning function without transferring the identification data of the information processing device to another image processing deice which does not have the scanning function, and wherein at least one of the image processing devices further includes:

a scanner that scans an image and outputs image data;

a computer-readable storage medium; and a processor configured to:

receive the identification data of an information processing device sent from the information processing device;

cause the computer-readable storage medium to store the received identification data of the information processing device;

select an information processing device whose identification data is stored in the computer-readable storage medium; and transfer the image data outputted from the scanner to the selected information processing device.

14. The medium according to claim 13, wherein the processor of each of the image processing devices is further configured to return the notification signal in response to a searching signal from an information processing device.

15. The medium according to claim 13, wherein the processor of at least one of the image processing devices is further configured to transmit, in response to identification data of an information processing device received from the information processing device being successfully stored into the computer-readable storage medium, an acknowledge signal to the information processing device, the acknowledge signal indicating the success of storing the identification data.

16. The medium according to claim 13, wherein the processor of an image processing device is further configured to broadcast the notification signal via the network.

17. The medium according to claim 13, wherein the program, when executed by the processor, further causes the information processing device to broadcast a search signal for searching an image processing device having a scanning function via the network.

18. The medium according to claim 13, wherein at least one of the information processing devices further includes an operation interface that is operated by a user, wherein the program, when executed by the processor, further causes the information processing device to transfer identification data of the information processing device to an image processing device having a scanning function selected by a user using the operation interface.

* * * * *